UNITED STATES PATENT OFFICE.

ALFRED J. WATTS, OF UTICA, NEW YORK.

IMPROVEMENT IN THE MANUFACTURE OF DENTISTS' CRYSTALLINE GOLD.

Specification forming part of Letters Patent No. 30,847, dated December 4, 1860.

*To all whom it may concern:*

Be it known that I, ALFRED J. WATTS, of Utica, in the county of Oneida and State of New York, have invented a new Manufacture of Gold for Filling or Plugging Teeth; and I do hereby declare that the following is a full, clear, and exact description of the manner of obtaining the same.

My invention consists in a new manufacture of gold, which I call "crystal" gold, obtained by electricity, for the purpose of filling teeth.

To obtain crystal gold take a glass dish about eleven (11) or twelve (12) inches long, five (5) or six (6) inches wide, and four (4) inches deep, or thereabout, and having fastened on the bottom of it, by means of gum-shellac dissolved in spirits of wine, a coating of heavy gold-foil, I fill it with distilled water containing or having dissolved in it about three and a half (3½) ounces, troy, muriate of ammonia, and add to it about one fluid ounce of a solution of the perchloride of gold, made by dissolving one ounce, troy, of gold in a mixture of three (3) fluid ounces of muriatic acid and one (1) fluid ounce of nitric acid of the ordinary commercial strength. I now take any quantity of gold—say from ten to twenty ounces, troy—rolled into plate and exposing nearly as much surface as the coated bottom and suspend it in the solution by any suitable means, and as near the top as possible, yet so as to have the gold well covered by the solution. The gold is inclosed in fine muslin to prevent detached scales and fragments from falling on the surface below as the operation proceeds. I connect the suspended gold to the positive end of a battery by platinum wires and the coated bottom of dish to the negative end by a thick gold wire covered and protected, except at its extreme end, (which touches the gold-covered bottom,) with gutta-percha inclosed in a fine glass tube.

The battery I use consists of a series of two cells, and, instead of charging it in the usual manner with sulphuric acid, I prefer to use a neutral solution of sulphate of copper in the negative or copper cups, and a strong solution of common salt (chloride of sodium) in the positive or zinc cups. I prefer this arrangement, though I can, and sometimes do, make the crystal gold with the battery charged in the usual manner. The size of the battery for obtaining crystal gold from the solution contained in the above dish may vary very much. The smallest size from which I have been successful in obtaining it consists of a pair of glass jars about twelve (12) inches deep and ten (10) inches broad, containing the negative or copper plates, fitting closely to their sides, and porous cells of earthenware, leather, plaster, or paper about thirteen (13) or fourteen (14) inches high and from seven (7) to eight (8) inches in diameter, holding the zinc cylinders, which were from five and a half (5½) to six and a half (6½) inches in diameter and well amalgamated. The largest size I have used were composed of tubs about eighteen (18) or twenty (20) inches high and about twenty-four (24) inches broad, the coppers and zincs and porous cells being as large in proportion; but I prefer to use a medium-sized battery, one a little larger than that first described, about the same diameter, but taller. At any rate, to produce this material I find I must use a battery which, when the full current it can generate is sent through the above solution, must cause the evolution of hydrogen very freely from the negative bottom.

Now I have described the batteries and solution, I will proceed to describe the peculiar manipulations I employ to obtain crystal gold.

Connected with and in the circuit of the electric current is the first turn of a long coil of ordinary copper bell-wire. The coil is on a cylinder of wood, with a deep groove cut on its face along its whole length, and is about two and a half (2½) inches in diameter and eighteen (18) inches long, and contains about one hundred and eighty turns. One end of this coil is free. The other end is connected with the protected gold wire in decomposition-dish. A stout copper wire, with a snake-head bite, is attached to the wire running to negative end of battery, and the bite being made to clasp or grip the first turn of the coil of wire, the circuit is established, and the full power, or nearly so, of battery acting upon the solution causes it to evolve hydrogen freely from the negative pole or coated bottom of dish. I now interpose in the path of the current ten, twenty, thirty, forty, fifty, one hundred, or more of turns of coil by means of the snake-head above described till the evolution of hydrogen ceases and the very black surface of deposit becomes lighter colored. I then cautiously, and at intervals of fifteen or twenty minutes, interpose a few more turns of the coil, carefully watching the surface by means of a good bright light, and waiting the effect of each change until I perceive it begins to glitter in parts here and there. I rest at this point, and gradually the surface becomes covered with a bright glitter. These are the forming crystals. With a large battery, and under some peculiar conditions not well understood, no further manipulation is required, and the crystals or leaves will become perfectly formed and the deposit go on without any further trouble; but this is rare. The ordinary course is this. After running about half an hour, less or more, according to state of battery, the bright glitter on the surface of the deposit fades, and if not attended to in time would wholly disappear, giving place in time to a dark, dirty, almost black-looking deposit. Now, to prevent this, as soon as I perceive the above change commencing I interpose in the path of the current from ten to twenty less turns of the coil, as I may judge proper, and the brightness returns, to fade again in the same manner after a short time, when the same operation of taking out from ten to twenty turns of coil is performed and the surface again brightens. I do this so long as there is any falling off in the brightness of the surface of the deposit, and at last reach a point at which it will continue in the form of perfectly bright leaf-like crystals, without further attention for twelve or twenty-four hours, and sometimes longer, if the conditions, temperature of room, strength of battery, &c., all remain the same; but as the deposit grows up from the bottom the distance between the poles is lessened, which would increase the quantity of electricity passing; but this effect is more than balanced by the constantly-increasing strength of the solution, for the whole of the gold in solution occupies always the space between the poles, so that when the dish is half full the strength of the solution will be doubled, hence requiring more battery-power to decompose it. There is also a constantly-increasing obstruction taking place by clogging up of the muslin bag inclosing the dissolving gold. The above causes, acting together, tend constantly to induce a change in the material being formed, and as the process advances I from time to time, according to my judgment, interpose less and less wire, and by so doing maintain the same uniform material all the way up, till desirable or necessary to stop it.

I have above described the use of one solution of gold and one mode of manipulating that solution; but I do not confine myself to that solution or that mode. There are many other solutions from which exactly the same material can be made, as the treble chloride of gold and sodium and ammonia and the treble chloride of gold and potassium and ammonia. The manipulation for procuring the crystal gold may also be differently conducted.

In the case above described I began at the top of the coil and caused the evolution of hydrogen; but I sometimes begin, and generally prefer to do so, from the bottom of the coil without producing hydrogen at all—that is, interpose the one hundred and eighty turns and gradually advance upward till I attain the desired result, reaching a point where it glitters and then fades, and after that conducting it along exactly in the same manner as before described.

I also can procure the crystal gold by varying the arrangement of vessels for making and receiving it. If my battery is not large enough or deficient in power to cover the extent of surface on bottom of dish above described, I employ a smaller dish or use a large porcelain vessel filled with the solution, before described, containing the same materials, but varied in quantity according to the amount of liquid in the vessel, and in that vessel place a smaller one of any convenient height, with its bottom coated with gold, like the one previously described, and suspend over it in the solution a plate of gold and proceed exactly as before described.

I also do not confine myself to that peculiar mode described of using a coil of wire to control the amount of electricity passing through the solution; but I lessen or increase the distance between the poles or strengthen or weaken my gold solution and make use of these well-known methods, as well as all others familiar to electricians; neither do I confine myself to the use of Daniell's battery. I use any other form from which I can obtain a good and steady current of electricity, my object in all cases being to obtain a current giving the same quantity and intensity for many days in succession. I also employ as an auxiliary a compass to compare my battery, to measure its force or power, and particularly to measure the current as it flows through the solution. I can make the crystal without the aid of a compass, but with it I can work more easily, as it quickly denotes those changes calling for an alteration in the length of the coil interposed, the advantage of which will readily occur to an experienced electrician.

I shall now proceed to point out the difference between this form of gold and all other forms mentioned by Mr. Smee in his work on electro-metallurgy, and to show from those laws therein given as regulating the deposit of every metal that this was entirely unknown to that distinguished experimentalist.

The laws above mentioned are as follows:

*Law* 1.—Metals are invariably thrown down as a black powder when the current of electricity is so strong in relation to the strength of the solution that hydrogen is freely evolved from the negative plate of the decomposition-cell.

*Law* 2.—Every metal is thrown down in a crystalline state when there is no evolution of hydrogen from the negative plate or no tendency thereto.

*Law 3.*—Metals are reduced in the reguline state when the quantity of electricity in relation to the strength of the solution is insufficient to cause the production of hydrogen on the negative plate in the decomposition-trough, and yet the quantity of electricity is very nearly sufficient to induce that phenomenon. It will be seen that according to this third law the deposit obtained under the circumstances above described for making crystal gold would be in the form of a solid plate instead of those leaves or crystals; but now the relative conditions between the quantity of electricity and the strength of solution designated by this third law is just what should be aimed at in making crystal gold, as will be seen by the subjoined list of the various formations which I have obtained by starting with a large excess of electricity and gradually lessening the power. First, mud or black powder, very black; second, amorphous, light colored; third, organic, lighter colored but lusterless; fourth, crystals, bright and glittering; fifth, arborescent, light colored but lusterless; sixth, grape, dark colored; seventh, sand, dark colored; eighth, solid plate of reguline, light-colored metal; ninth, rough, hard, knobby crystals on its surface. These are the grand varieties, each admitting of further subdivisions as it attains a point tending to change it into a higher or lower formation, and each liable to be mixed, in the operation of making it, with the one above or below it, from sudden changes in any of the conditions controlling the quantity and intensity of the electric current. The deposit which I term "crystal" gold, and which forms the subject of my invention, is the fourth in the above list, and in making it none of the other varieties must be mixed with it, for just in proportion as their is any admixture of any of them so will the working qualities of the material as a filling for teeth be damaged, the crystals alone possessing the distinguishing quality which constitutes the value of this form of gold—namely, adhesiveness. The further removed in the scale the variety mixed with it is from its own proper form the more injurious will be its effect, a mixture of the sand and mud varieties with the very best and highest quality of crystal gold entirely spoiling it for the purpose intended.

I have thus shown by a certain arrangement of some of the salts of gold and the alkalies, and by graduating the strength of the solution in relation to the quantity and intensity of electricity decomposing it, I can obtain a form of gold—namely, that which I term "crystal" gold—hitherto undescribed, and, as far as I am aware, entirely unknown to science. It occurs in the form of bright leaves or leaf-like crystals, which generally present to view perfectly-defined serrated edges when examined by a microscope of suitable power. They are generally broad in proportion to their length, but sometimes so slender in proportion to their length as scarcely to appear serrated, and under certain circumstances the serrations entirely disappear. They have a perfectly-bright metallic appearance, and they form after proper burning a soft, plastic, tough, and tenacious mass of gold, which may be more readily, easily, and perfectly consolidated by pressure than any other form of gold hitherto known. It is used for filling or plugging teeth in the same manner as the other forms of gold, as foil or sponge, hitherto used for the purposes of dentists.

What I claim as my invention, and desire to secure by Letters Patent as a new manufacture, is—

The crystal gold herein described, obtained by a process substantially as herein specified.

ALFRED J. WATTS.

Witnesses:
  B. F. FLOWER,
  J. D. DAVIS.